United States Patent
Crorey

[11] Patent Number: 6,142,725
[45] Date of Patent: *Nov. 7, 2000

[54] ROTATABLE SHUTTLE TRANSFER UNIT

[75] Inventor: David Crorey, Utica, Mich.

[73] Assignee: Norgren Automotive, Inc., Mt. Clemens, Mich.

[*] Notice: This patent is subject to a terminal disclaimer.

[21] Appl. No.: 09/353,477

[22] Filed: Jul. 13, 1999

Related U.S. Application Data

[63] Continuation of application No. 08/620,784, Mar. 18, 1996, Pat. No. 5,924,545.

[51] Int. Cl.$^7$ .................................................. B65G 65/00
[52] U.S. Cl. ........................ 414/753.1; 198/379; 212/316; 414/758
[58] Field of Search ......................... 414/753.1, 758, 414/746.8, 746.3; 212/316, 330, 332; 198/379, 375, 621.1

[56] References Cited

U.S. PATENT DOCUMENTS

| | | | |
|---|---|---|---|
| 2,390,293 | 12/1945 | Colson | 294/86.41 |
| 3,805,967 | 4/1974 | Scannell | 212/330 X |
| 4,317,398 | 3/1982 | Jones et al. | 83/435.18 X |
| 4,444,540 | 4/1984 | Blatt et al. | 414/589 |
| 4,543,034 | 9/1985 | Blatt et al. | 414/752 |
| 4,697,487 | 10/1987 | Cameron | 83/435.18 X |
| 4,727,976 | 3/1988 | Tsuchiya et al. | 198/403 |
| 4,750,132 | 6/1988 | Pessina et al. | 294/86.41 X |
| 5,013,213 | 5/1991 | Roberts et al. | 414/798.9 |
| 5,181,599 | 1/1993 | Blatt | 198/468.6 |
| 5,215,181 | 6/1993 | Blatt | 198/468.2 |
| 5,445,282 | 8/1995 | Erikkila | 901/16 X |

FOREIGN PATENT DOCUMENTS

| | | |
|---|---|---|
| 0271008 | 12/1986 | European Pat. Off. . |
| 0337906 | 10/1989 | European Pat. Off. . |
| 2002705 | 2/1979 | United Kingdom . |
| 2202552 | 9/1988 | United Kingdom . |
| 2232944 | 1/1991 | United Kingdom . |

OTHER PUBLICATIONS

GB Search Report Under Section 17, Dated May 22, 1997 for GB 9703818.6.

*Primary Examiner*—Donald W. Underwood
*Attorney, Agent, or Firm*—Young & Basile, P.C.

[57] ABSTRACT

A rotatable shuttle transfer unit for transferring a workpiece from a first work station to a second work station along a predetermined path of travel wherein a pair of spaced carriages carry the workpiece along the predetermined path of travel and rotate the workpiece from a first angular orientation to a second angular orientation with respect to an axis of rotation. Preferably, the carriages rotate the workpiece while carrying the workpiece along the predetermined path of travel. The carriages are transported along a guiderail which extends between the first and second work stations. A continuous drive belt reciprocally drives the carriages along the guiderail wherein the continuous drive belt extends from one end of the guiderail to the opposite end of the guiderail. A vertical lift portion reciprocally moves the workpiece in a direction substantially normal to the predetermined path of travel. In addition, the carriages provide releasable power clamps for engaging and securing the workpiece.

3 Claims, 3 Drawing Sheets

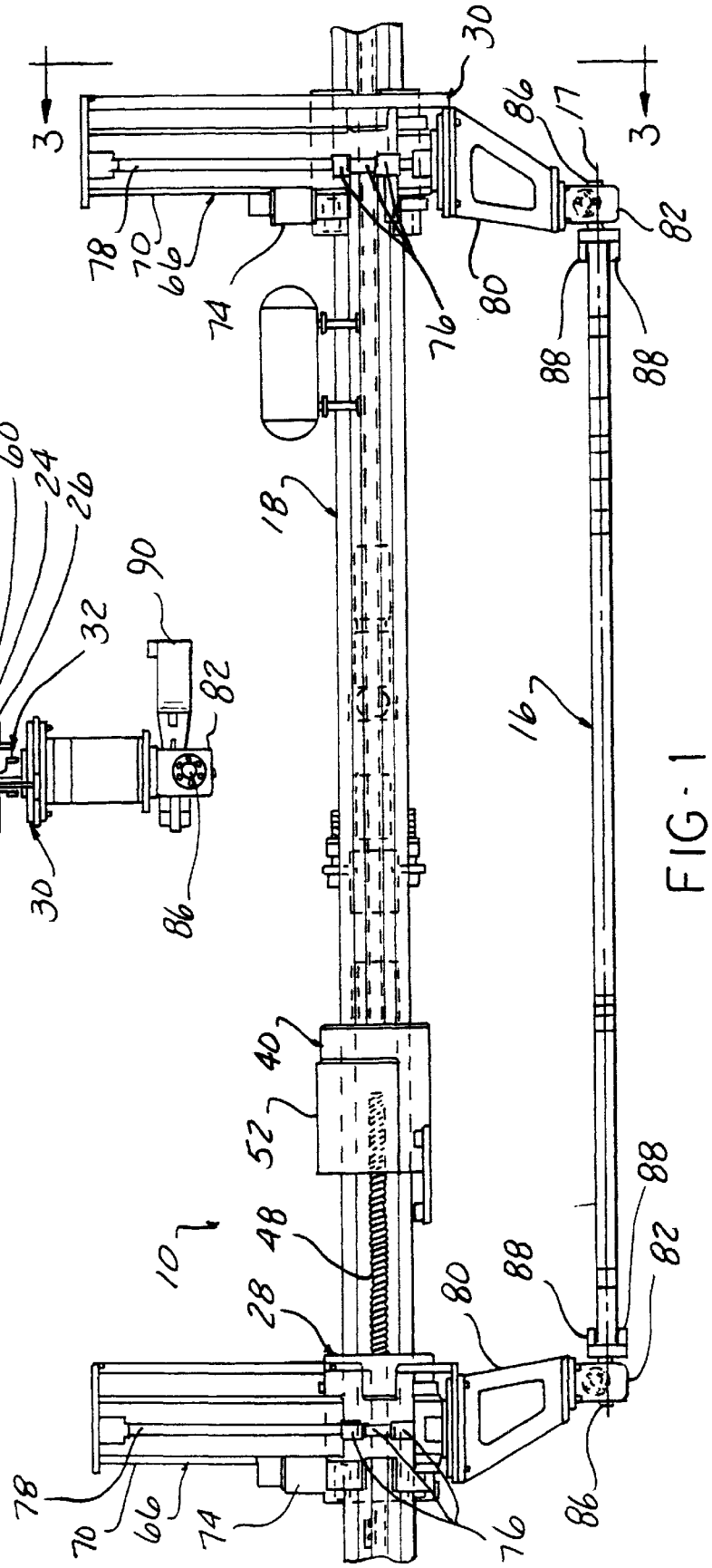
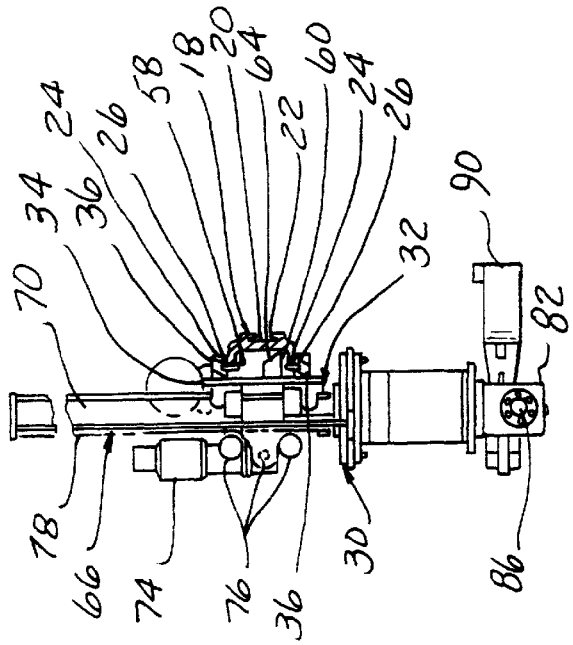
FIG-3
FIG-1

ROTATABLE SHUTTLE TRANSFER UNIT

This application is a Continuation of U.S. patent application Ser. No. 08/620,784, filed on Mar. 18, 1996 and allowed on Feb. 19, 1999 as U.S. Pat. No. 5,924,545.

FIELD OF THE INVENTION

The present invention relates to the transferring of a workpiece between work stations, and more particularly, to a shuttle transfer unit that carries and rotates the workpiece along a predetermined path of travel between a first work station and a second work station.

BACKGROUND OF THE INVENTION

Generally, shuttle transfer units, of the general type of which the present invention is concerned, typically include a fixed frame spanning across a plurality of work stations. The shuttle transfer unit transports a workpiece between work stations, and each work station typically performs some type of manufacturing or assembly process on the workpiece.

When these shuttle transfer units load and unload the workpiece to and from the work stations, the workpiece must be orientated in a proper manner to allow for the proper fixturing and processing of the workpiece in the associated work station. This can become a rather difficult task when the workpieces have rather large and irregular geometries, such as motor vehicle chassis and frames.

Often, such motor vehicle frames and chassis must be rotated or rolled over 180° such that both sides of the chassis or frames may be made accessible for various types of machining and welding processes. Currently, due to the size and shapes of such workpieces, the workpieces are typically re-orientated or rotated at a separate work station. The workpieces are then transported to a subsequent work station wherein the workpieces are fixtured for subsequent sequential processing of the workpiece. Such handling of the workpiece requires the additional space, equipment and time required for simply re-orientating the workpiece with respect to the production line. In addition, each work station requires the workpiece to be clamped or fixtured, thus requiring new datums and references to be established and thereby increasing the range of tolerances. Obviously, such processing breeds inefficiencies and is undesirable in a production environment.

It would be desirable to provide a shuttle transfer unit that re-orientates a large, irregular workpiece, such as a motor vehicle chassis or frame, while transferring the workpiece from one work station to a subsequent work station without requiring the need for a separate and additional work station for re-orientating the workpiece.

SUMMARY OF THE INVENTION

The present invention provides a rotatable shuttle transfer unit for transferring a workpiece from a first work station to a second work station along a predetermined path of travel wherein a carriage means carries the workpiece along the predetermined path of travel and rotates the workpiece from a first angular orientation to a second angular orientation with respect to an axis of rotation. Preferably, the carriage means rotates the workpiece while carrying the workpiece along the predetermined path of travel.

The shuttle transfer unit also provides a means for transporting the carriage means along a guiderail which extends between the first work station and the second work station. An endless belt means reciprocally drives the carriage means in guided movement along the guiderail. The endless belt means extends from one end of the guiderail means to an opposite end of the guiderail means and is connected to the carriage means. A power driving means, which is mounted to the guiderail and coupled to the endless belt means, drives the endless belt means.

The shuttle transfer unit also provides a means for reciprocally moving the workpiece in a direction substantially normal to the predetermined path of travel. Preferably, the reciprocal moving means moves in a vertical direction so as to provide a vertical lift portion for loading and unloading the workpiece to and from the work stations. Thus, the predetermined path of travel is preferably linear and horizontal.

The carriage means of the shuttle transfer unit also provides a means for releasably engaging the workpiece. This allows the shuttle transfer unit to load and unload the workpiece to and from the work stations. Preferably, the releasable engaging means provides a means for releasably clamping the workpiece.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference and numerals refer to like parts throughout several views, and wherein:

FIG. 1 is a front elevational view of the shuttle transfer unit in accordance with the present invention;

FIG. 3 is a cross sectional view taken along line 3—3 of FIG. 1;

DETAIL DESCRIPTION OF THE PREFERRED EMBODIMENT

Figure 4C:
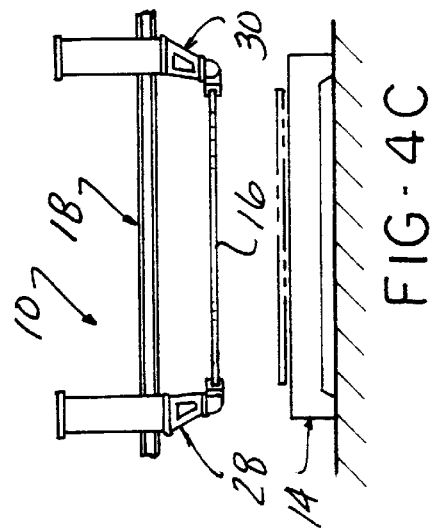
FIG. 4C is a schematic diagram showing the shuttle transfer unit at the opposite end of the predetermined path wherein the workpiece is positioned above the second work station.

Referring to the drawings, the present invention will now be described in detail with reference to the preferred embodiment.

Figure 2:
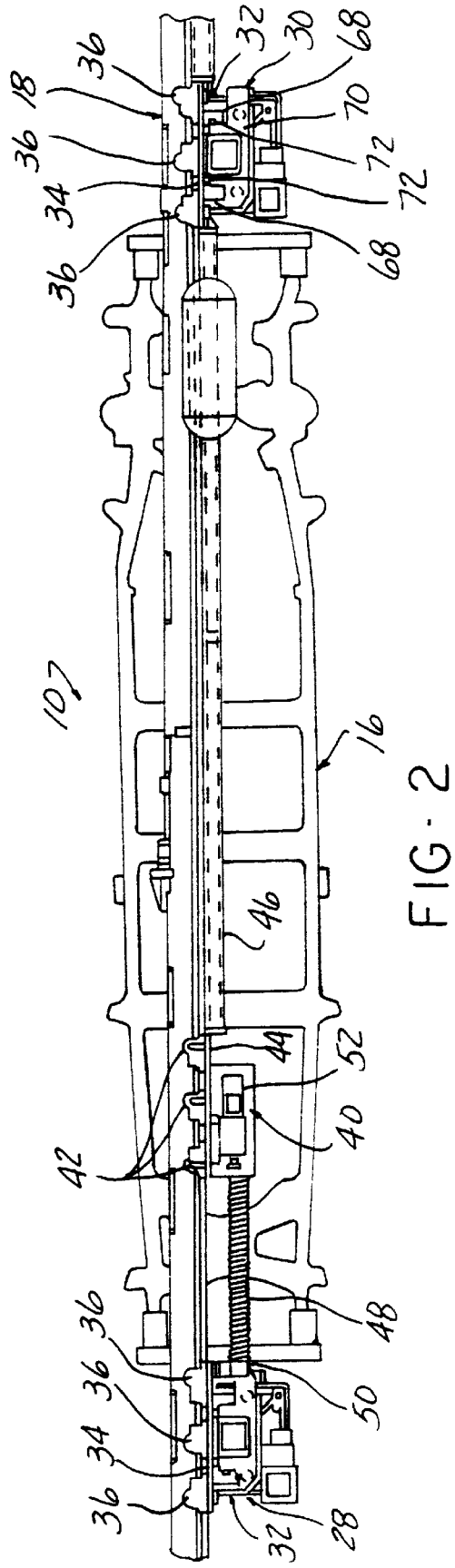
FIG. 2 is a top view of the shuttle transfer unit.

FIGS. 1 and 2 shows a rotatable shuttle transfer unit 10 as described in the aforesaid invention. The rotatable shuttle transfer unit 10 provides a guiderail means that extends between a first work station 12 and a second work station 14 and a carriage means that is movably supported on the guiderail means. The carriage means has a means for releasably engaging a workpiece 16, such as a motor vehicle frame or chassis. Although the present invention is not limited to the workpiece 16 being a motor vehicle frame or chassis, it should be noted that the present invention is ideally suited for the workpiece 16 to be of a structure similar to a motor vehicle frame or chassis. The carriage means is transported along the guiderail means such that the workpiece 16 is carried along a predetermined path of travel. In addition, the carriage means may provide a means for rotating the workpiece 16 from a first angular orientation to a second angular orientation with respect to an axis 17 of the workpiece 16 for rotation thereabout. The rotatable shuttle transfer unit 10 may also provide a means for reciprocally moving the workpiece 16 in a direction normal to the predetermined path of travel so as to allow for the loading and unloading of the workpiece 16 to and from the first and second work stations 12, 14.

To movably support the carriage means between work stations 12, 14, the guiderail means may provide an overhead guiderail 18 which extends over and between the first and second work stations 12, 14, as seen in FIGS. 1–4C. The guiderail 18 has a substantially C-shaped cross section 20 wherein the guiderail 18 provides a substantially vertical member 22 and a pair or similar opposing substantially horizontal members 24 extending transversely from each end of the vertical member 22. A pair of similar running rails 26 extend outwardly from the opposing horizontal members 24. The running rails 26 are substantially parallel to the vertical member 22 and extend the entire length of the guiderail 18.

Figure 5:
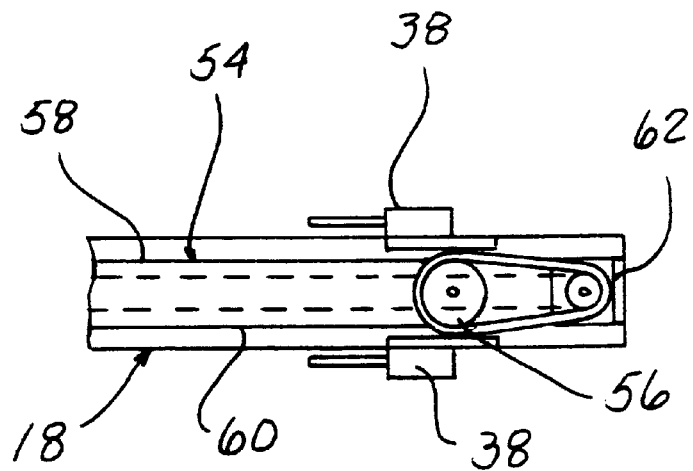
FIG. 5 is a top view of one end of the guiderail showing the continuous drive belt and shock absorbers.

In order for the rotatable shuttle transfer unit 10 to transfer the workpiece 16 from the first work station 12 to the second work station 14, the carriage means provides a pair of substantially similar carriages 28, 30 movably supported and guided by the guiderail 18 for reciprocal movement along the guiderail 18. Each of the carriages 28, 30 provides a substantially similar frame 32 for supporting the carriages 28, 30 on the guiderail 18. The frame 32 of the carriages 28, 30 includes a carriage plate 34 that spans across the width of the guiderail 18. A plurality of roller assemblies 36 are provided at opposite ends of the carriage plate 34 to engage the running rails 26 and guide the carriages 28, 30 for horizontal movement along the guiderail 18. Preferably, each of the carriages 28, 30 provides three equally spaced roller assemblies 36 at each of the opposite ends of each carriage plate 34. As seen in FIG. 5, a shock absorbing means having a pair of similar shock absorbers 38 mounted at each end of the guiderail 18 may be utilized to absorb kinetic energy from the moving carriages 28, 30 should the carriages 28, 30 extend in an over travel position and approach the ends of the guiderail 18.

As seen in FIGS. 1–2, the carriages 28, 30 are spaced at a predetermined distance along the guiderail 18. A means for adjusting the distance between the carriages 28, 30 on the guiderail 18 is provided by a linear adjustment carriage 40 spaced between the two carriages 28, 30. The linear adjustment carriage 40 is movably supported and guided on the guiderail 18 in a manner similar to the two carriages 28, 30, wherein three equally spaced roller assemblies 42 are mounted at each of the opposite ends of the carriage plate 44 of the linear adjustment carriage 40. The linear adjustment carriage 40 has a fixed bar 46 having a hollow rectangular cross section with one of its ends connected to the linear adjustment carriage 40 and its other end connected to one of the two carriages 28, 30. The opposite end of the linear adjustment carriage 40 has a worm gear or screw 48 extending outward from the linear adjustment carriage 40 and substantially parallel to the guiderail 18 wherein the screw 48 is received by a threaded engagement 50 in the frame 32 of the other of the two carriages 28, 30. A reversible motor 52 is provided on the linear adjustment carriage 40, and the reversible motor 52 may rotate the screw 48 in either direction so as to increase or decrease the linear distance between the two carriages 28, 30 along the guiderail 18. The linear distance between the two carriages 28, 30 may require adjustment when different shape and size workpieces 16 are processed by the shuttle transfer unit 10.

In order to drive the carriages 28, 30 along the guiderail 18, the endless belt means provides a continuous drive belt 54 which extends from one end of the guiderail 18 to an opposite end of the guiderail 18. As seen in FIG. 5, a sprocket 56 is mounted at each end (only one end shown) of the guiderail 18 such that the drive belt 54 has an upper and lower portion 58, 60, respectively, extending between and substantially parallel to the horizontal members 24 of the guiderail 18. A reversible drive 62 powers rotation of the sprockets 56 and thus drives rotation of the drive belt 54 in either direction. At least one of the two carriages 28, 30 has its associated frame 32 connected to an upper or lower portion 58, 60 of the drive belt 54. In the preferred embodiment, only one of the carriages 28, 30 has a drive belt mount 64 which extends outward from the carriage plate 34 and is connected to the lower portion 60 of the continuous drive belt 54, as seen in FIG. 3.

To lift and lower the workpiece 16 to and from the work stations 12, 14, the reciprocal moving means moves the workpiece 16 in a direction substantially normal to the predetermined path of travel. Preferably, the predetermined path of travel is substantially horizontal and substantially parallel to the guiderail 18, and thus, the reciprocal moving means provides vertical movement that is substantially normal to the predetermined path of travel. As seen in FIGS. 1–3, the reciprocal moving means provides a vertical lift portion 66 wherein the frame 32 of the carriage 28, 30 supports a pair of substantially parallel and opposing running rails 68 connected to the carriage plate 34 and extending away from the guiderail 18. An elongate substantially U-shaped portion 70 provides rollers 72 extending laterally from its ends wherein the rollers 72 are supported in tracks of the running rails 68 to allow for the U-shaped portion 70 to roll or slide vertically along the running rails 68.

In order to power vertical reciprocal movement of the U-shaped portion 70 along the running rails 68, the vertical lift portion 66 provides a reversible motor 74 and a series of pulleys 76 to lift and lower the U-shaped portion 70. The motor 74 is attached to the frame 32 of the carriage 28, 30, and the series of three staggered pulleys 76 extend outward from the motor 74. A timing belt 78 is connected to a top portion of the U-shaped portion 70, and the timing belt 78 is weaved through the series of pulleys 76 and connected to a bottom portion of the U-shaped portion 70. The motor 74 drives the pulleys 76 which in turn feed the timing belt 78 through the pulleys 76 to provide for the vertical reciprocal movement of the U-shaped portion 70.

Figure 6:
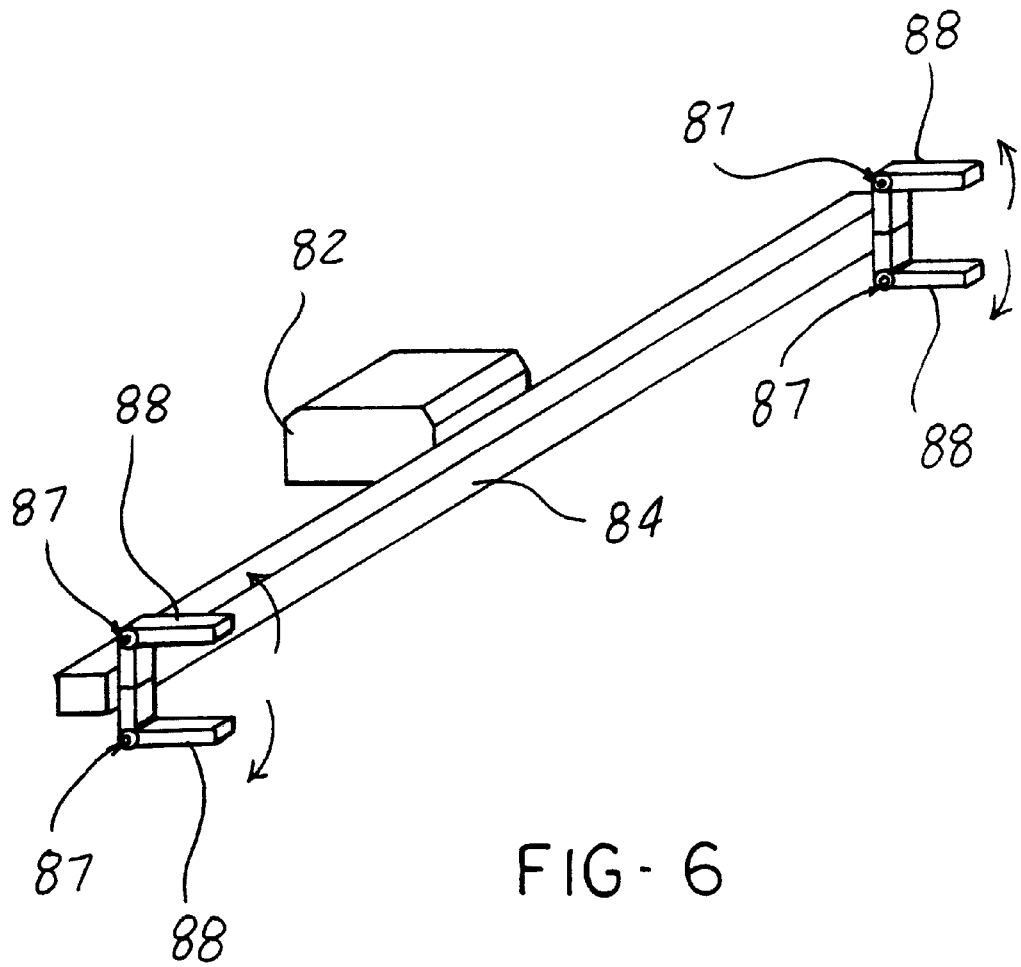
FIG. 6 is a schematic perspective view showing the mounting arrangement of the clamps and their respective movement.

The vertical lift portion 66 of each of the carriages 28, 30 has a substantially trapezoidal shaped bracket 80 connected to the lower end of the U-shaped portion 70. Each of the trapezoidal brackets 80 extend vertically downward and have a small housing 82 mounted to the bottom of the trapezoidal bracket 80. The small housings 82 provide for rotational support of a releasable engagement means for engaging the workpiece 16. As seen in FIGS. 1, 3, and 6, the releasable engagement means provides a linear elongate bar 84 with an axle shaft 86 integral with and extending substantially normal from the elongate bar 84. The axle shaft 86 is received and rotatably supported by the housing 82 for rotation about the longitudinal axis of the axle shaft 86. The elongate bar 84 has a releasable clamping means mounted at each end of the elongate bar 84. Each of the releasable clamping means provides a pair of power actuated clamps 87 with opposing clamping arms 88 that are pneumatically power driven between a closed or clamped position and an open or unclamped position. To open or move to the unclamped position, the clamping arms 88 pivot and rotate outwardly away from the workpiece 16 so that the clamping arms 88 clear the workpiece 16 when the workpiece 16 is unloaded into the work station 12, 14 and the clamping arms 88 are lifted by the vertical lifting portion 66. It should be noted that the present invention is not limited to the specific structure of the clamps 87 as defined, but rather, the present invention may include any structure or clamp adapted for the particular structure of the workpiece 16.

In order to rotate the workpiece 16, a reversible motor 90 is connected to the small housing 82, and the reversible motor 90 cooperatively engages the axle shaft 86 in which the elongate bar 84 is connected thereto. The power actuated clamps 87 are mounted to the elongate bar 84, and thus, when the workpiece 16 is clamped by the clamping arms 88, the motor 90 rotates the workpiece 16 about the longitudinal axis 17 of the shaft 86. Preferably, the axis 17 of the workpiece 16 is coaxially aligned with the longitudinal axis 17 of the axle shaft 86, and thus, the workpiece 16 is rotated from a first angular orientation to a second angular orientation with respect to the axis 17. In the preferred embodiment, the workpiece 16 is rotated 180° between the first and second angular orientations with respect to the axis 17 of rotation.

Figure 4B:
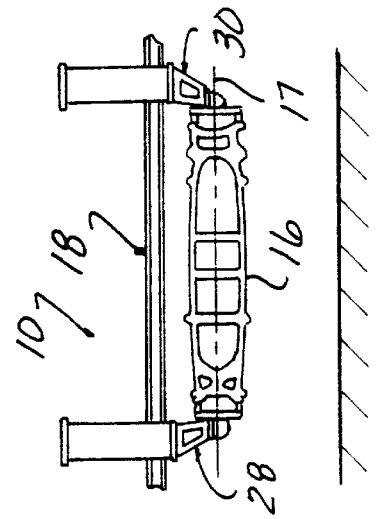
FIG. 4B is a schematic diagram showing the shuttle transfer unit midway along the predetermined path of travel wherein the workpiece is shown rotated 90° degrees.
Figure 4A:
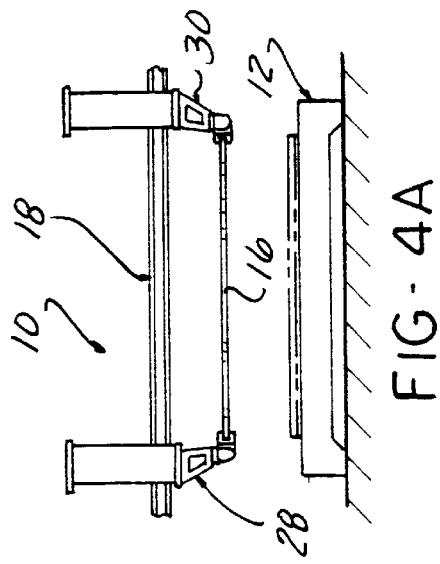
FIG. 4A is a schematic diagram showing the workpiece raised above the first work station at one end of the predetermined path of travel.

In operation, the clamping arms 88 of the rotatable shuttle transfer unit 10 releasably engage the workpiece 16 at the first work station 12. The vertical lift portion 66 lifts the workpiece 16 from the first work station 12 towards the guiderail 16 without rotating the workpiece 16, as seen in FIG. 4C. The continuous drive belt 84 drives both carriages 28, 30 along the guiderail 16 or predetermined path of travel while the reversible motor 90 rotates the workpiece 16 180° about the axis 17 of rotation, as seen in FIG. 4B. Once the carriages 28, 30 have reached the end of the predetermined path of travel and the workpiece 16 has completed its rotational movement, as seen in FIG. 4C, the vertical lift portion 66 lowers the workpiece 16 into the second work station 18. The releasable clamps 87 release the workpiece 16, and the vertical lift portion 66 lifts the releasable engaging means away from the second work station 14 toward the guiderail 16, wherein the carriages 28, 30 return to the first work station 12 to sequentially engage a subsequent workpiece.

It should be noted that the invention is not limited to the workpiece 16 being rotated while moving along the predetermined path of travel, but rather, the present invention may include the workpiece 16 rotating and moving along the predetermined path of travel sequentially, or in other words, at different times. In addition, the vertical lift portion 66 may also lift and lower the workpiece 16 while the workpiece 16 is rotating and moving between work stations 12, 14.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the sphere and scope of the appended claims, which scope is to be accorded the broadest interpretation so as to encompass all such modifications and equivalent structures as is permitted under the law.

The invention claimed is:

1. A rotatable shuttle transfer unit for transferring a workpiece from a first workstation to a second workstation along a predetermined path of travel, and said workpiece having an axis for rotation thereabout comprising:

an overhead horizontal guide rail extending along said predetermined path;

a pair of similar carriages movably supported and guided by said guide rail for reciprocal movement along said guide rail, and said pair of similar carriages spaced a predetermined distance from one another along said guide rail;

means, disposed on said guide rail and connected to at least one of said carriages, for reciprocally driving said carriages in guided movement along said guide rail and moving said workpiece along said predetermined path of travel;

at least one motor, supported by at least one of said carriages, for powering rotation of said workpiece from a first angular orientation to a second angular orientation with respect to said axis of rotation while said carriages move said workpiece along said predetermined path of travel;

means, connected to said at least one motor, for releasably clamping said workpiece;

a linear adjustment carriage rollably mounted to said guide rail between said carriages;

a fixed bar having one end connected to said linear adjustment carriage and an opposite end connected to one of said pair of carriages;

a threaded member extending from said linear adjustment carriage to said other of said pair of carriages wherein said other carriage operably receives said threaded member; and a reversible motor connected to said linear adjustment carriage for driving said threaded member and adjusting the linear distance between said carriages.

2. The rotatable shuttle transfer unit as stated in claim 1, further comprising:

said at least one motor and clamping means are operatively connected to rotate said workpiece substantially 180° between said first angular orientation and said second angular orientation with respect to said axis of rotation.

3. The rotatable shuttle transfer unit as stated in claim 1, further comprising:

an elongated lift portion connected to each of said carriages for reciprocal vertical movement of said workpiece relative to said guide rail.

* * * * *